United States Patent
Kato et al.

(10) Patent No.: US 6,264,264 B1
(45) Date of Patent: Jul. 24, 2001

(54) ROTARY DAMPER DEVICE AND SUN VISOR ATTACHING APPARATUS BY USING THE SAME

(75) Inventors: Shinichi Kato, Yokosuka; Akinori Harada, Sagamihara, both of (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/514,323

(22) Filed: Feb. 28, 2000

(30) Foreign Application Priority Data

Mar. 4, 1999 (JP) .................................................. 11-056397

(51) Int. Cl.$^7$ ......................................................... B60J 1/02
(52) U.S. Cl. ............................................ 296/97.12; 403/65
(58) Field of Search ................................ 296/97.4, 97.12, 296/97.13, 97.9; 403/65, 73, 82, 301

(56) References Cited

U.S. PATENT DOCUMENTS

| | | | |
|---|---|---|---|
| 5,338,083 | * | 8/1994 | Gute ...................................... 296/97.9 |
| 5,383,700 | * | 1/1995 | Argo et al. ............................ 296/97.9 |
| 5,454,617 | * | 10/1995 | Welter ................................... 296/97.9 |
| 5,556,155 | * | 9/1996 | Welter ................................. 296/97.12 |
| 5,564,772 | * | 10/1996 | Miller ................................. 296/97.12 |
| 5,697,122 | * | 12/1997 | Okabe et al. ............................. 16/82 |
| 5,720,370 | * | 2/1998 | Takahashi ............................. 188/310 |
| 5,769,188 | * | 6/1998 | Okabe et al. ...................... 188/82.84 |
| 5,924,748 | * | 7/1999 | Zapinski ........................ 296/97.12 X |
| 6,019,415 | * | 1/2000 | Viertel et al. ................. 296/97.12 X |
| 6,059,348 | * | 5/2000 | Viertel et al. ........................ 296/97.9 |

* cited by examiner

Primary Examiner—D. Glenn Dayoan
Assistant Examiner—Lori L. Coletta
(74) Attorney, Agent, or Firm—Kanesaka & Takeuchi

(57) ABSTRACT

In a rotary damper device and a sun visor attaching apparatus using the same, a damping force works in one way. The rotary damper device includes a case, a rotor and a viscous fluid. The rotor is rotatably held in the case and connected to a shaft. The viscous fluid is sealed in the case. The rotor includes a rotary vane, a through-hole passing through the vane, and a valve. The rotary vane is used to agitate the viscous fluid. The valve opens the through-hole when the shaft is rotated in one direction and closes the through-hole when the shaft is rotated in the other direction.

7 Claims, 6 Drawing Sheets

ROTARY DAMPER DEVICE AND SUN VISOR ATTACHING APPARATUS BY USING THE SAME

BACKGROUND OF THE INVENTION AND RELATED ART STATEMENT

The invention relates to a rotary damper device and a sun visor attaching apparatus using the same, in particular, a rotary damper device wherein a damping force works in one way.

Heretofore, sun visor attaching apparatuses have been known, wherein rotary damper devices are not provided, as disclosed in, for example, Japanese Patents No. 2535188 and No. 2535189.

However, in the conventional attaching apparatuses as described above, in case a sun visor is closed toward a roof of a vehicle, there has been such a problem that the sun visor strikes the roof to generate an offensive or uncomfortable sound. Especially, in case a spring is used to close the sun visor, a large sound is generated to thereby impair an atmosphere in the vehicle.

In view of the above defects, the present invention has been made, and an object of the invention is to provide a one-way rotary damper device having a relatively simple structure.

Another object of the invention is to provide a one-way rotary damper device as stated above, wherein a damping force can be varied according to a rotation of a shaft.

A further object of the invention is to provide a rotary damper device suitable for a sun visor attaching structure.

Further objects and advantages of the invention will be apparent from the following description of the invention.

SUMMARY OF THE INVENTION

The invention has been made in order to attain the above objects, and characteristics of the invention are explained below.

The invention according to the first aspect has two characteristics. First, a rotary damper device is formed of a case, a rotor, and a viscous fluid. The rotor is rotatably held in the case and connected to a shaft. The viscous fluid is sealed in the case.

Second, the rotor includes a rotary vane, a through-hole and a valve. The rotary vane is used for agitating the viscous fluid. The through-hole passes through the rotary vane from a front surface to a rear surface. The valve opens the through-hole when the shaft rotates in one direction. On the other hand, the valve closes the through-hole when the shaft rotates in the other direction.

The invention according to the second aspect has the following characteristics in addition to the characteristics described in the first aspect. Namely, a space and a blocking device, i.e. higher portion on the side of the rotor, are provided between the case and the rotor. The viscous fluid passes through the space in a direction perpendicular to a rotating direction of the rotor.

The blocking device, i.e. the higher portion on the side of the rotor, makes the space for a predetermined rotating angle of the shaft. On the other hand, the blocking device blocks the space for a rotating angle except for the predetermined rotating angle of the shaft.

Incidentally, although the higher portion on the side of rotor is mentioned as the blocking device, the blocking device is not limited thereto, and the blocking device may be disposed on the side of the case or the cap thereof.

The invention according to the third aspect has the following three characteristics.

First, an attaching apparatus of a sun visor includes a shaft; a bearing member; a rest or holding device, for example a spring; a rotating force generating device, for example the spring and projections of the shaft; and the rotary damper device.

The shaft is attached to the roof of a vehicle at one end thereof. The bearing member is fixed to the sun visor and rotatably supports the other end of the shaft.

The rest or holding device, i.e. spring, allows the sun visor to rest at a desired rotating angle on the other end of the shaft. Incidentally, although the spring is exemplified as the rest device, the rest device is not limited thereto.

The rotating force generating device, i.e. the spring and projections of the shaft, functions to provide at least a rotating force right before the sun visor rotates toward the roof and is stored thereat. Incidentally, although the spring and projections are exemplified as the rotating force generating device, the rotating force generating device is not limited thereto. The rotary damper device is connected to the other end of the shaft to attenuate the rotating force in one way.

Incidentally, although the bearing member and the damping device are formed separately, they may be integrally formed.

Second, the rotary damper device is formed of the case, rotor and viscous fluid. The case is fixed to the sun visor. The rotor is rotatably held in the case and is connected to the other end of the shaft. The viscous fluid is sealed in the case.

Third, the rotor includes the rotary vane, the through-hole and the valve. The rotary vane is used for agitating the viscous fluid. The through-hole passes through the rotary vane. The valve usually opens the through-hole, but, the valve closes the through-hole when the rotating force is applied.

DETAILED DESCRIPTION OF PREFERRED EMBODIMENTS

FIGS. 1–16 show an embodiment of the present invention.

Figure 1:
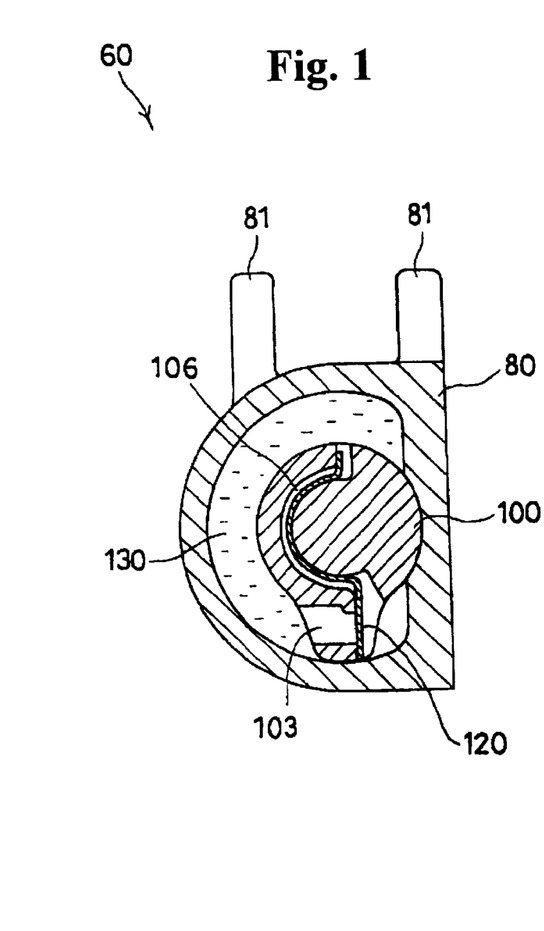
FIG. 1 is a sectional view of a rotary damper device.
Figures 2, 3:
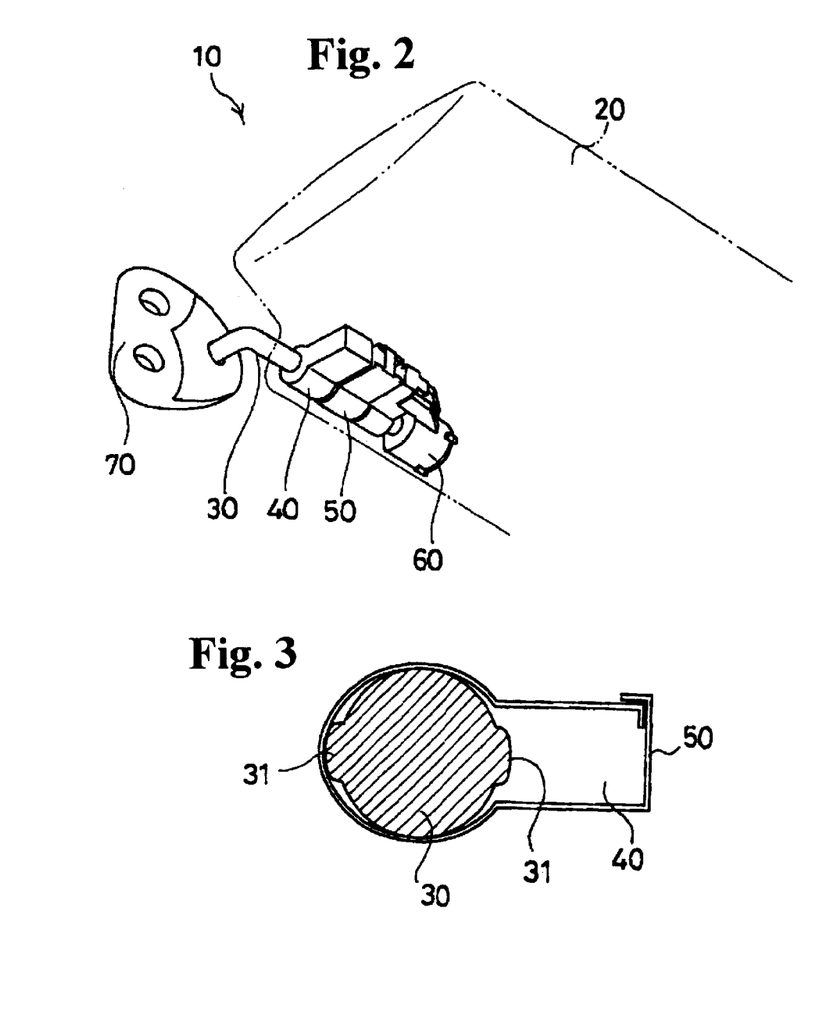
FIG. 2 is a perspective view of a sun visor attaching apparatus.
FIG. 3 is a sectional view of a spring.

FIG. 1 is a sectional view of a rotary damper device; FIG. 2 is a perspective view of a sun visor attaching apparatus; and FIG. 3 is a sectional view of a spring.

Figure 4:
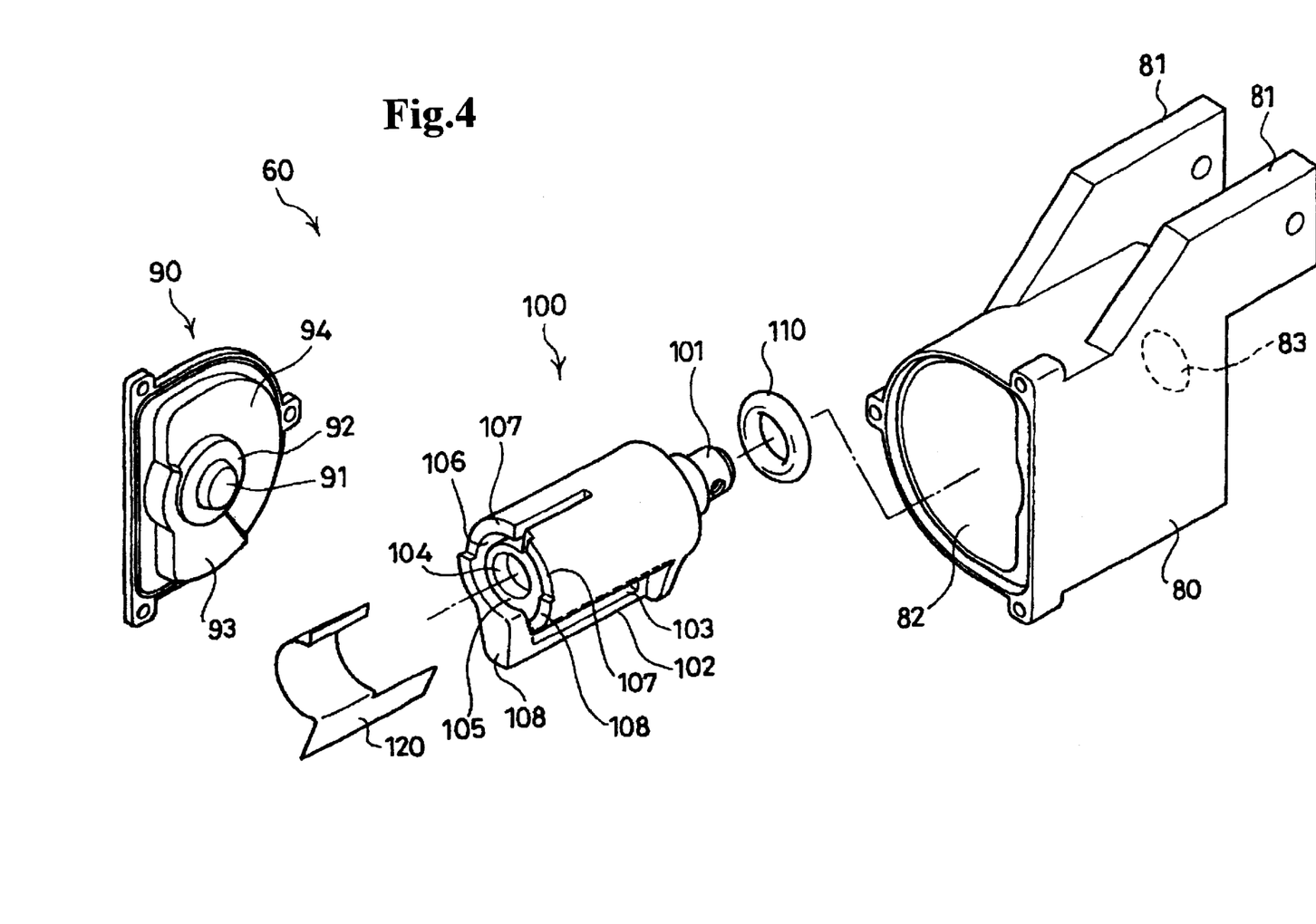
FIG. 4 is an exploded perspective view of the rotary damper device.
Figure 5:
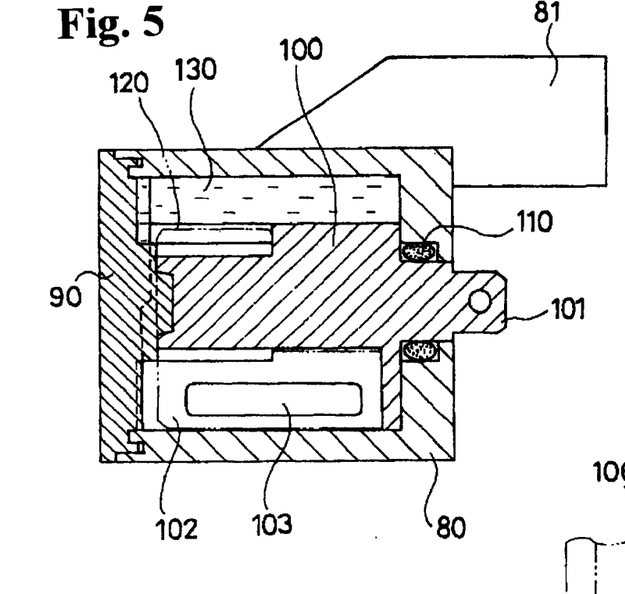
FIG. 5 is a sectional view of the rotary damper device.
Figure 6:
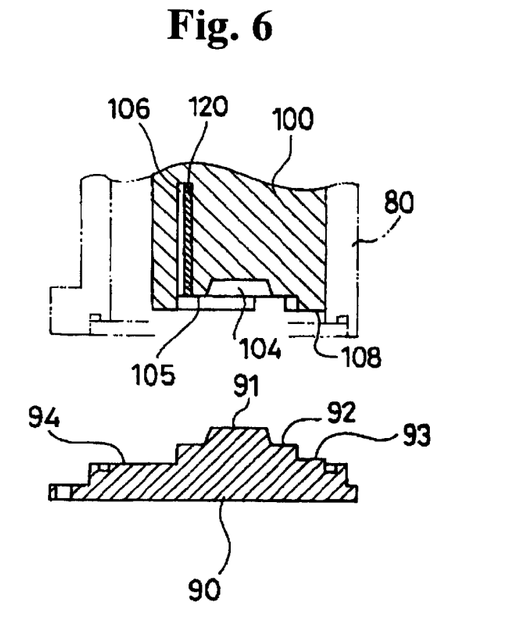
FIG. 6 is a partially exploded sectional view of the rotary damper device.

FIGS. 4–6 show the rotary damper device, respectively, wherein FIG. 4 is an exploded perspective view of the rotary damper device; FIG. 5 is a sectional view of the rotary damper device; and FIG. 6 is a partially exploded sectional view of the rotary damper device.

Figure 7:
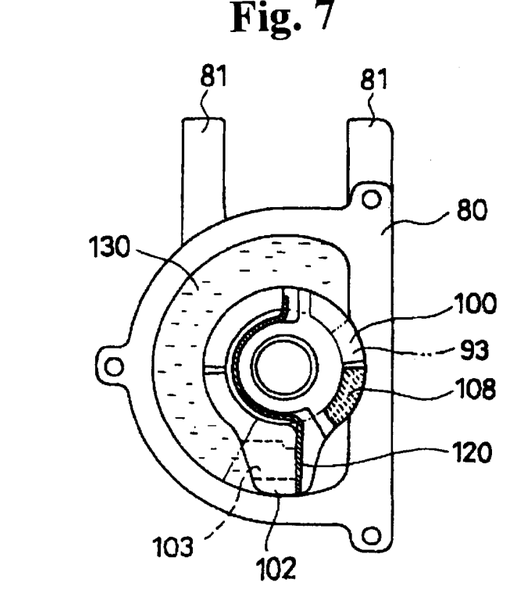
FIG. 7 is a sectional view of the rotary damper device in case the sun visor is located at a storing position when the sun visor is rotated from the storing position to a using position.
Figure 8:
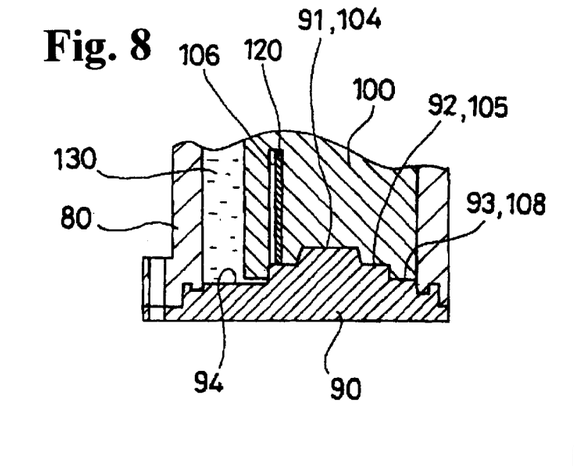
FIG. 8 is a horizontal sectional view of FIG. 7.
Figure 9:
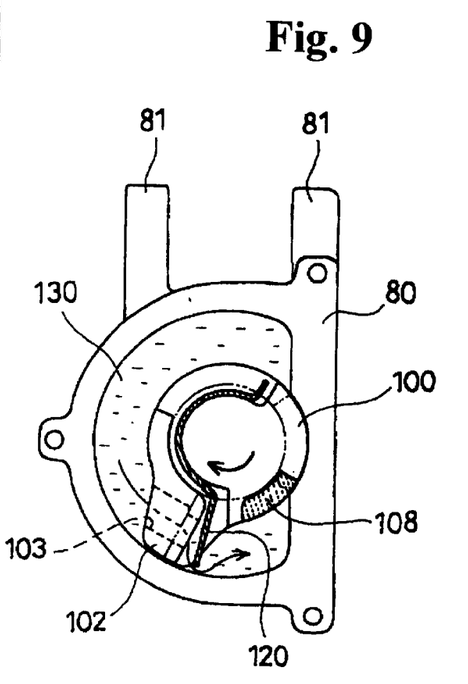
FIG. 9 is a sectional view, corresponding to FIG. 7, showing a state where the sun visor is rotated.
Figure 10:
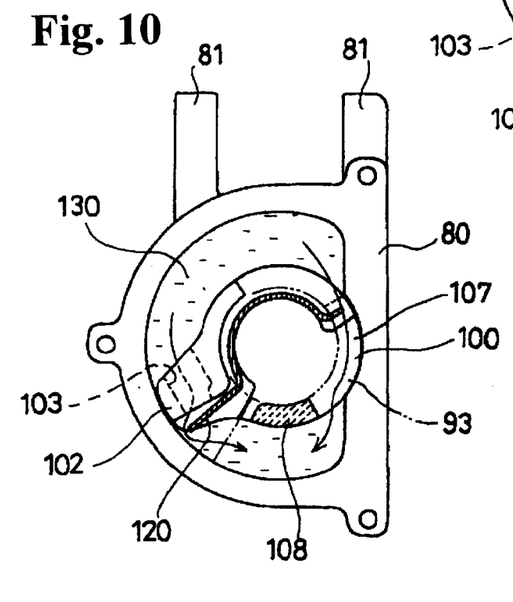
FIG. 10 is a sectional view, corresponding to FIG. 7, showing a state where the sun visor is further rotated from the condition shown in FIG. 9.
Figure 11:
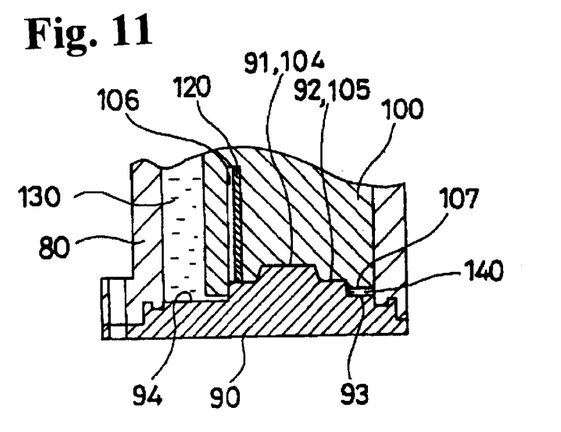
FIG. 11 is a horizontal sectional view of FIG. 10.
Figure 12:
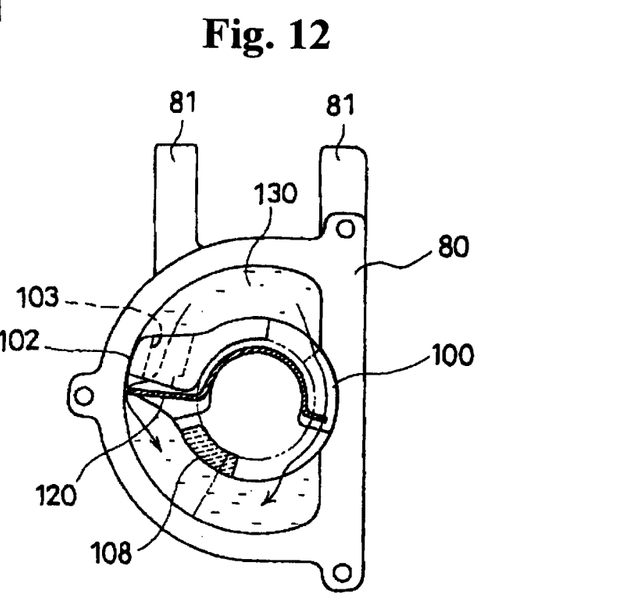
FIG. 12 is a sectional view, corresponding to FIG. 7, showing a state where the sun visor is further rotated from the condition shown in FIG. 10.

FIGS. 7–12 show states where the sun visor is being rotated from a storing position to a using position, respectively, wherein FIG. 7 is a sectional view of the rotary damper device when the sun visor is at the storing position; FIG. 8 is a horizontal sectional view of FIG. 7; FIG. 9 is a sectional view, corresponding to FIG. 7, showing a state where the sun visor is rotated; FIG. 10 is a sectional view, corresponding to FIG. 7, showing a state where the sun visor is further rotated more than that shown in FIG. 9; FIG. 11 is a horizontal sectional view of FIG. 10; and FIG. 12 is a sectional view, corresponding to FIG. 7, showing a state where the sun visor is further rotated more than that shown in FIG. 10.

Figure 13:
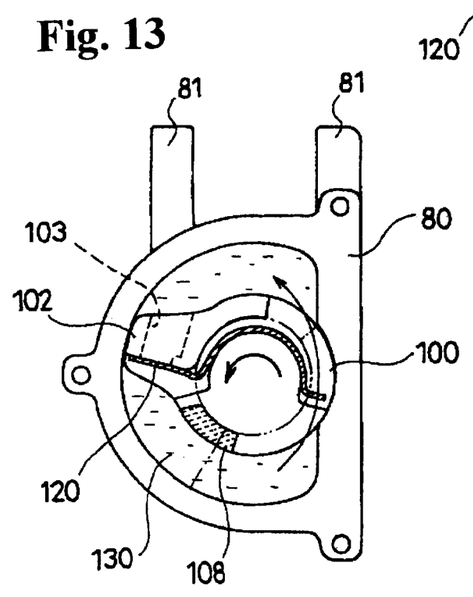
FIG. 13 is a sectional view of the rotary damper device in case the sun visor is rotated from the using position when the sun visor is rotated from the using position to the storing position.
Figure 14:
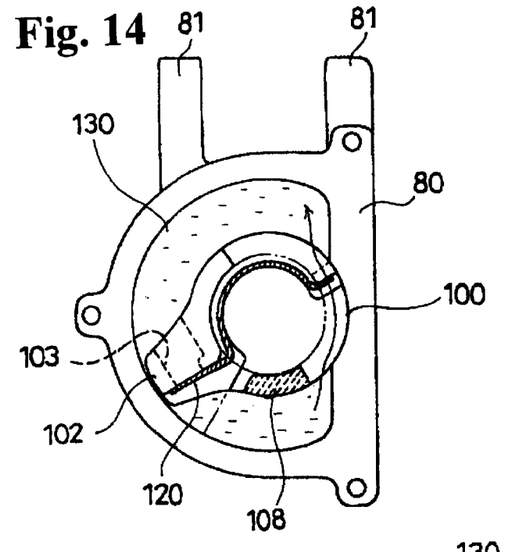
FIG. 14 is a sectional view, corresponding to FIG. 13, showing a state where the sun visor is further rotated.
Figure 15:
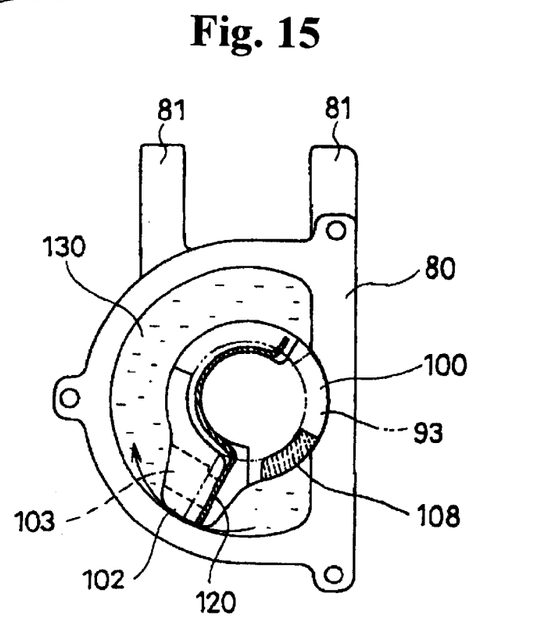
FIG. 15 is a sectional view, corresponding to FIG. 13, showing a state where the sun visor is further rotated from the condition in FIG. 14.
Figure 16:
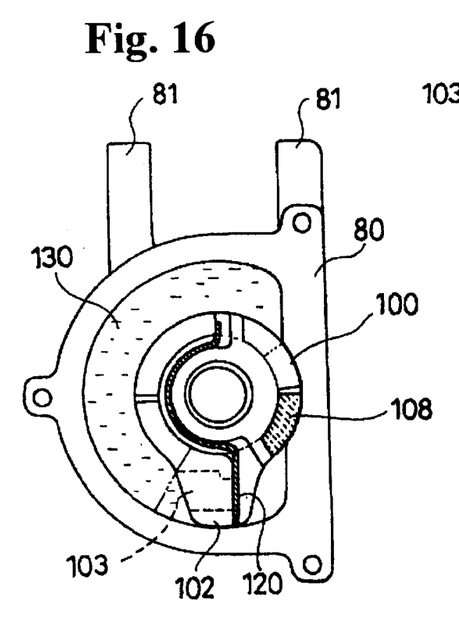
FIG. 16 is a sectional view of the rotary damper device when the sun visor is positioned at the storing position.

FIGS. 13–16 show states where the sun visor is rotated from the using position to the storing position, respectively, wherein FIG. 13 is a sectional view of the rotary damper device when the sun visor is rotated from the using position; FIG. 14 is a sectional view, corresponding to FIG. 13, showing a state where the sun visor is further rotated; FIG. 15 is a sectional view, corresponding to FIG. 13, showing a state where the sun visor is further rotated more than that shown in FIG. 14; and FIG. 16 is a sectional view of the rotary damper device when the sun visor is at the storing position.

In FIG. 2, reference numeral 10 shows an attaching apparatus of the sun visor 20. The attaching apparatus 10, as shown in FIGS. 2 and 3, includes a shaft 30, a bearing member 40, a spring 50, and the rotary damper device 60.

One end of the shaft 30, as shown in FIG. 2, is attached, for example, to a roof (not shown) of a vehicle through a bracket 70.

Also, the other end of the shaft 30, as shown in FIG. 3, is provided with at least a pair of projections 31 radially extending from an outer circumference thereof.

Incidentally, in the drawings, although the shaft 30 for the sun visor 20 of the vehicle is exemplified, a shaft for another part of the vehicle or a shaft for a part other than the vehicle may be employed.

The bearing member 40, as shown in FIG. 2, is fixed to the sun visor 20 to rotatably support the sun visor to the other end portion of the shaft 30.

More specifically, the sun visor 20 is supported by the bearing member 40 and is rotated around the shaft 30 between an approximately horizontal storing position close to the roof (not shown), as shown in FIG. 2, and a shielding position apart from the roof (not shown).

The spring 50, as shown in FIG. 3, nips an outer circumference of the other end of the shaft 30 having the two projections 31 from the upper and lower directions in the same drawing.

More specifically, the spring 50 is formed of a leaf spring, as shown in FIG. 3. Also, it is structured such that the sun visor 20 can be rested at any rotating angle between the storing position and the shielding position by a frictional resistance between an inner surface of the spring 50 and an outer circumference of the shaft 30.

Also, in case the shaft 30 is rotated relative to the spring 50, through not shown, the spring 50 is opened in the upper and lower directions in FIG. 3 pushed by the pair of the projections 31 to thereby provide a rotating force with respect to the shaft 30 by a restoring force of the spring 50. The rotating force reversely changes in its rotating direction at a point right before the sun visor 20 is stored in the storing position.

The rotary damper device 60 is, though not shown, connected to the other end of the shaft 30 to attenuate the rotating force created by the spring 50 and the pair of projections 31 of the shaft 30. In particular, the rotary damper device 60 includes, as shown in FIGS. 1 and 4, a case 80, a cap 90, a rotor 100, an 0-ring 110, a valve 120 and a viscous fluid 130.

The case 80, as shown in FIG. 4, includes two attaching pieces 81 and is fixed to the sun visor 20 therethrough, though not shown. In particular, the case 80 has an approximately cylindrical shape, as shown in FIGS. 4 and 5, one side surface of which has an opening 82. The other side surface of the case 80 is provided with a shaft hole 83 through which a connecting shaft 101 of the rotor 100 to be housed therein passes.

The cap 90 seals the opening 82 of the case 80, as shown in FIG. 5. More specifically, the cap 90 is, as shown in FIGS. 4 and 6, formed of a projecting shaft 91, an annular portion 92, a fan shape portion 93 and a lower portion 94, wherein heights of these portions are determined as: the projecting shaft 91>the annular portion 92>the fan shape portion 93>the lower portion 94.

The rotor 100 has a cylindrical shape, as shown in FIGS. 1 and 4, and includes a rotary vane 102 extending radially outwardly from an outer circumference thereof. The rotary vane 102, as shown in FIG. 1, has a through-hole 103 passing through front and rear surfaces thereof.

Also, one side surface of the rotor 100 is provided with the connecting shaft 101, as shown in FIG. 4. The connecting shaft 101, as shown in FIG. 5, passes through the shaft hole 83 of the case 80 to be projected outwards and to be connected to the shaft 30, though not shown, so that the connecting shaft 101 can be integrally rotated with the shaft 30.

The other side surface of the rotor 100, as shown in FIGS. 4 and 6, includes a receiving groove 104, an annular portion 105, an attaching groove 106, a sub-level portion 107 and a higher portion 108, the depths of which are determined as: the receiving groove 104>the annular portion 105>the sub-level portion 107>the higher portion 108, except for the attaching groove 106, as shown in FIG. 6.

The depths of the above portions except for the attaching groove 106 are set with respect to the heights of the portions of the cap 90 with the following relationships.

Depth of receiving groove 104=Height of projecting shaft 91 of cap 90

Depth of annular portion 105=Height of annular portion 92 of cap 90

Depth of higher portion 108=Height of fan shape portion 93 of cap 90

Depth of sub-level 107<Height of fan shape portion 93 of cap 90

With respect to a relationship between the depth of the sublevel 107 and the height of the fan shape portion 93 of the cap 90, when the rotor 100 is rotated, there is created a space 140, as shown in FIG. 11, at a position where the fan shape portion 93 of the cap 90 faces the sub-level portion 107.

The connecting shaft 101 of the rotor 100 is inserted into an O-ring 110, as shown in FIG. 5, so that the 0-ring 110 seals between an outer circumferential surface of the connecting shaft 101 of the rotor 100 and an inner circumferential surface of the shaft hole 83 of the case 80.

As shown in FIG. 1, the valve 120 is inserted into the attaching groove 106. The valve 120 inserted into the attaching groove 106 of the rotor 100 is held therein, as shown in FIGS. 1 and 5. The valve 120 closes the through-hole 103 of the rotary vane 102 with its spring force, as shown in FIGS. 1 and 5. In case the sun visor 20 is rotated to the using position from the storing position, as shown in FIGS. 9, 10 and 12, the valve 120 is pushed by the viscous fluid 130 to thereby open the through-hole 103 of the rotary vane 102. On the contrary, in case the sun visor 20 is rotated reversely from the using position to the storing position, as shown in FIGS. 13–15, the valve 120 is reversely pushed by the viscous fluid 130, and also returned by the spring force to thereby close the through-hole 103 of the rotary vane 102.

The viscous fluid 130 is filled into the case 80 and sealed therein through the cap 90. Although silicone oil is used as the viscous fluid 130, the viscous fluid is not limited thereto.

Next, the operation of the rotary damper device 60 having the structure as described above is explained.

First, as shown in FIG. 7, the valve 120 closes the through5 hole 103 of the rotary vane 102 when the sun visor 20 is at the storing position thereof. At this time, the fan shape portion 93 of the cap 90 and the higher portion 108 of the rotor 100 are closely contact with each other, as shown in FIG. 8.

Thereafter, when the sun visor 20 is rotated from the storing position to the using position, as shown in FIGS. 9, 10 and 12, the valve 120 is pushed by the viscous fluid 130 to thereby open the through-hole 103 of the rotary vane 102. Thus, the damping force of the rotary damper device 60 does not work to thereby allow the sun visor 20 to rotate toward the using position with a relatively small force.

Also, when the sun visor 20 is rotated slightly from the storing position, as shown in FIG. 11, the fan shape portion 93 of the cap 90 and the sub-level portion 107 of the rotor 100 face each other to thereby form a space 140 therebetween. Therefore, as shown in FIGS. 10 and 12, the viscous fluid 130 passes through the space 140 to thereby reduce the force required for rotating the sun visor 20.

On the other hand, in case the sun visor 20 is rotated reversely from the using position to the storing position, as shown in FIGS. 13—15, the valve 120 is pushed by the viscous fluid 130 in the reverse direction, and, also, restored by the spring force to thereby close the through-hole 103 of the rotary vane 102.

Therefore, the viscous fluid 130 flows between a forward end of the rotary vane 102 and the inner surface of the case 80 to thereby generate a damping force by the rotary damping device 60. At this time, as shown in FIG. 11, the fan shape portion 93 of the cap 90 and the sub-level portion 107 of the rotor 100 face each other to thereby form a space 140 therebetween. Therefore, as shown in FIGS. 13-15, the viscous fluid 130 passes through the space 140 to thereby reduce the force required for rotating the sun visor 20.

Then, right before the sun visor 20 reaches the storing position, as shown in FIG. 8, the fan shape portion 93 of the cap 90 and the higher portion 108 of the rotor 100 face each other to closely contact with each other. Thus, there is no space 140 between the fan shape portion 93 and the higher portion 108, as shown in FIG. 15, so that the viscous fluid 130 flows through only the space between the forward end of the rotary vane 102 and the inner surface of the case 80 to thereby make the damping force largest by the rotary damping device 60.

At this time, a rotating force is generated by the spring 50 and the pair of the projections 31 of the shaft 30, and the sun visor 20 is rotated toward the storing position by the rotating force. However, since the damping force by the rotary damper device 60 becomes largest, the sun visor 20 is slowly and silently rotated toward the roof (not shown) to thereby prevent a colliding sound from being created by the collision of the sun visor 20 and the roof.

The present invention having the structure as described above has the following effects.

According to the first aspect of the invention, there is provided a one-way rotary damper device having a relatively simple structure.

According to the second aspect of the invention, there is provided a one-way rotary damper device, wherein a damping force can be varied according to a rotation of the shaft, in addition to the effect of the first aspect.

According to the third aspect of the invention, there is provided a one-way rotary damper device, wherein the rotary damper is suitable for a structure for attaching the sun visor.

While the invention has been explained with reference to the specific embodiments of the invention, the explanation is illustrative and the invention is limited only by the appended claims.

What is claimed is:

1. A rotary damper device comprising:

a case;

a viscous fluid sealed in the case;

a rotor rotatably situated in the case and including a rotary vane for agitating the viscous fluid, a through-hole formed in the rotary vane, and a valve disposed on the through-hole for opening the through-hole when the rotor is rotated in one direction and closing the through-hole when the rotor is rotated in the other direction;

a passage defined between the case and the rotor for allowing the viscous fluid to pass perpendicular to an axis of the rotor; and a blocking device formed between the case and the rotor in the passage and rotated together with the rotor, said blocking device opening the passage for a predetermined rotating angle of the rotor, and blocking the passage except for said predetermined rotating angle.

2. A rotary damper device as claimed in claim 1, wherein said case includes a fan-shaped portion, and said rotor includes a sub-level portion facing the fan-shaped portion, said fan-shaped portion and sub-level portion forming said passage and the blocking device.

3. A rotary damper device as claimed in claim 1, wherein said rotor includes a semicircular attaching groove, and said valve has semicircular portion disposed in the semicircular attaching groove and a flat portion disposed over the through-hole.

4. A sun visor attaching apparatus comprising:

a shaft having a first end portion to be attached to a vehicle and a second end portion, a bearing member to be fixed to a sun visor and rotatably supporting the second end portion of the shaft, a spring attached to the sun visor for holding the second end portion, said spring holding the sun visor at a desired rotating angle relative to the second end portion, a rotating force generating device attached to the second end portion of the shaft, said rotating force generating device cooperating with the spring and generating a rotating force to the shaft with the sun visor through the spring right before the sun visor is rotated toward a roof for storage, and a one-way rotary damper device for damping a rotating force of the sun visor, including a case fixed to the sun visor, a viscous fluid sealed in the case, and a rotor rotatably held in the case and connected to the second end of the shaft, said rotor having a rotary vane for agitating the viscous fluid, a through-hole formed in the rotary vane, and a valve disposed on the through-hole for opening the through-hole when the rotor is rotated in one direction and closing the through-hole when the rotor is rotated in the other direction.

5. A sun visor attaching apparatus as claimed in claim 4, wherein said rotating force generating device is formed of at least one projection radially outwardly projecting from an outer surface of the second end portion, said projection engaging the spring.

6. A rotary damper device as claimed in claim 1, wherein said blocking device completely blocks the passage slightly before the rotor comes to a full stop position.

7. A rotary damper device as claimed in claim 2, wherein said case includes a cylindrical shape portion, and a cap having said fan-shaped portion and attached to the cylindrical shape portion.

* * * * *